(12) United States Patent
Threadgold

(10) Patent No.: US 12,372,170 B2
(45) Date of Patent: Jul. 29, 2025

(54) TENSION MOUNT IMPROVEMENTS

(71) Applicant: Air Diffusion Agencies Pty Ltd, Welland (AU)

(72) Inventor: William Trevor Threadgold, Welland (AU)

(73) Assignee: Air Diffusion Agencies Pty Ltd (AU)

( * ) Notice: Subject to any disclaimer, the term of this patent is extended or adjusted under 35 U.S.C. 154(b) by 88 days.

(21) Appl. No.: 18/004,050

(22) PCT Filed: Jun. 30, 2021

(86) PCT No.: PCT/AU2021/000042
§ 371 (c)(1),
(2) Date: Dec. 30, 2022

(87) PCT Pub. No.: WO2022/000016
PCT Pub. Date: Jan. 6, 2022

(65) Prior Publication Data
US 2023/0265946 A1    Aug. 24, 2023

(30) Foreign Application Priority Data

Jul. 2, 2020    (AU) ............................. 2020902257

(51) Int. Cl.
*F16L 3/202*    (2006.01)
*F16L 3/18*    (2006.01)
*F16L 3/24*    (2006.01)

(52) U.S. Cl.
CPC ............... *F16L 3/202* (2013.01); *F16L 3/18* (2013.01); *F16L 3/243* (2019.08)

(58) Field of Classification Search
CPC ... F16L 3/202; F16L 3/18; F16L 3/243; F16L 3/16; F16L 3/26; E04B 9/006;
(Continued)

(56) References Cited

U.S. PATENT DOCUMENTS

| 433,687 | A | * | 8/1890 | Little et al. | ............... | H02G 3/20 |
| | | | | | | 174/61 |
| 5,893,538 | A | * | 4/1999 | Onishi | .................. | F16L 3/2431 |
| | | | | | | 248/65 |

(Continued)

FOREIGN PATENT DOCUMENTS

| DE | 19734556 C1 * | 12/1998 | ............ F16L 3/1016 |
| FR | 907313 A | 3/1946 | |

(Continued)

OTHER PUBLICATIONS

International Search Report and Written Opinion mailed Aug. 3, 2021, issued in corresponding International Application No. PCT/AU2021/000042, filed Jun. 30, 2021, 12 pages.
(Continued)

*Primary Examiner* — Kimberly T Wood
(74) *Attorney, Agent, or Firm* — Christensen O'Connor Johnson Kindness PLLC

(57) ABSTRACT

The present disclosure relates to a tension or hanging mount for engineering services, including but not limited to components of heating, ventilating, and air-conditioning (HVAC) systems. In one aspect, the tension mount comprises at least a base portion and a mount portion which depends from the base portion by hanging, wherein each of the base portion and the mount portion comprise a substantially rigid, non-flammable structural support element, and wherein at least one of these substantially rigid, non-flammable structural support elements is at least partially covered in a cushioning material in regions at or near to where the base portion and the mount portion are in contact with each other, and wherein in use, the mount portion is not dropped by the base portion even if the cushioning materials are consumed by a fire.

19 Claims, 18 Drawing Sheets

(58) Field of Classification Search
CPC ...... E04B 9/064; E04B 9/18; E04B 2009/186;
H02G 3/0456; H02G 3/263; H02G 3/30;
F24F 13/0254; F24F 13/32; E04H 9/0215
USPC .... 411/551, 552, 84, 85, 508, 509; 248/317,
248/343
See application file for complete search history.

(56) References Cited

U.S. PATENT DOCUMENTS

| | | | | |
|---|---|---|---|---|
| 2005/0173363 | A1* | 8/2005 | Herb | F16L 3/16 |
| | | | | 212/83 |
| 2008/0014014 | A1* | 1/2008 | Nehls | F16B 37/00 |
| | | | | 403/1 |
| 2012/0163005 | A1* | 6/2012 | Liu | F21S 4/28 |
| | | | | 362/427 |

FOREIGN PATENT DOCUMENTS

| | | |
|---|---|---|
| FR | 2099008 A5 | 3/1972 |
| JP | S5562116 U | 4/1980 |
| JP | H06193773 A * | 7/1994 |
| JP | H07269525 A * | 10/1995 |
| JP | H08144423 A | 6/1996 |
| JP | 5943697 B2 | 7/2016 |
| KR | 102118997 B1 | 6/2020 |
| WO | 2018/000017 A1 | 1/2018 |

OTHER PUBLICATIONS

Extended European Search Report mailed Jun. 27, 2024, issued in corresponding European Application No. EP 21834093, filed Jun. 30, 2021, 7 pages.

* cited by examiner

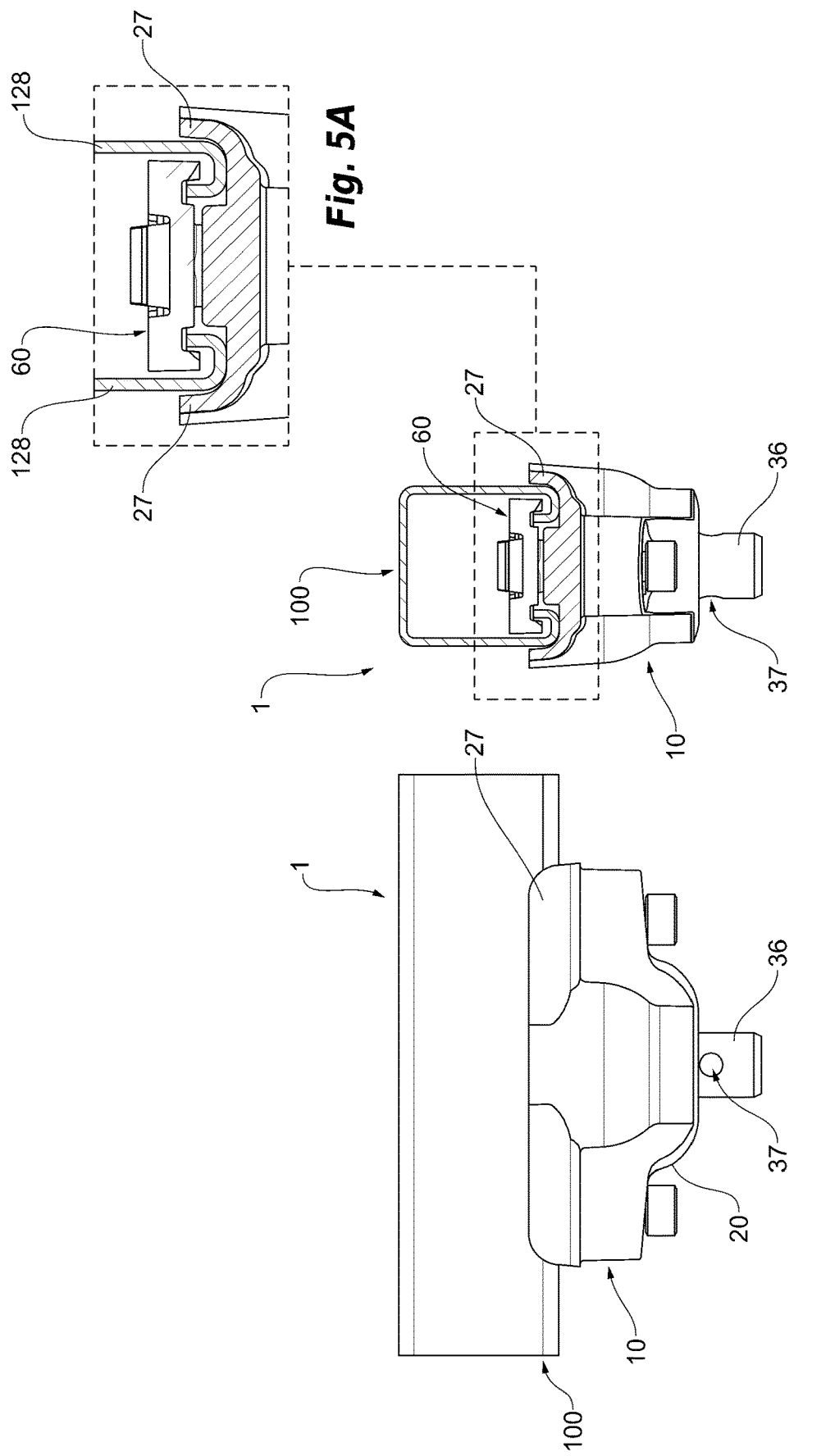

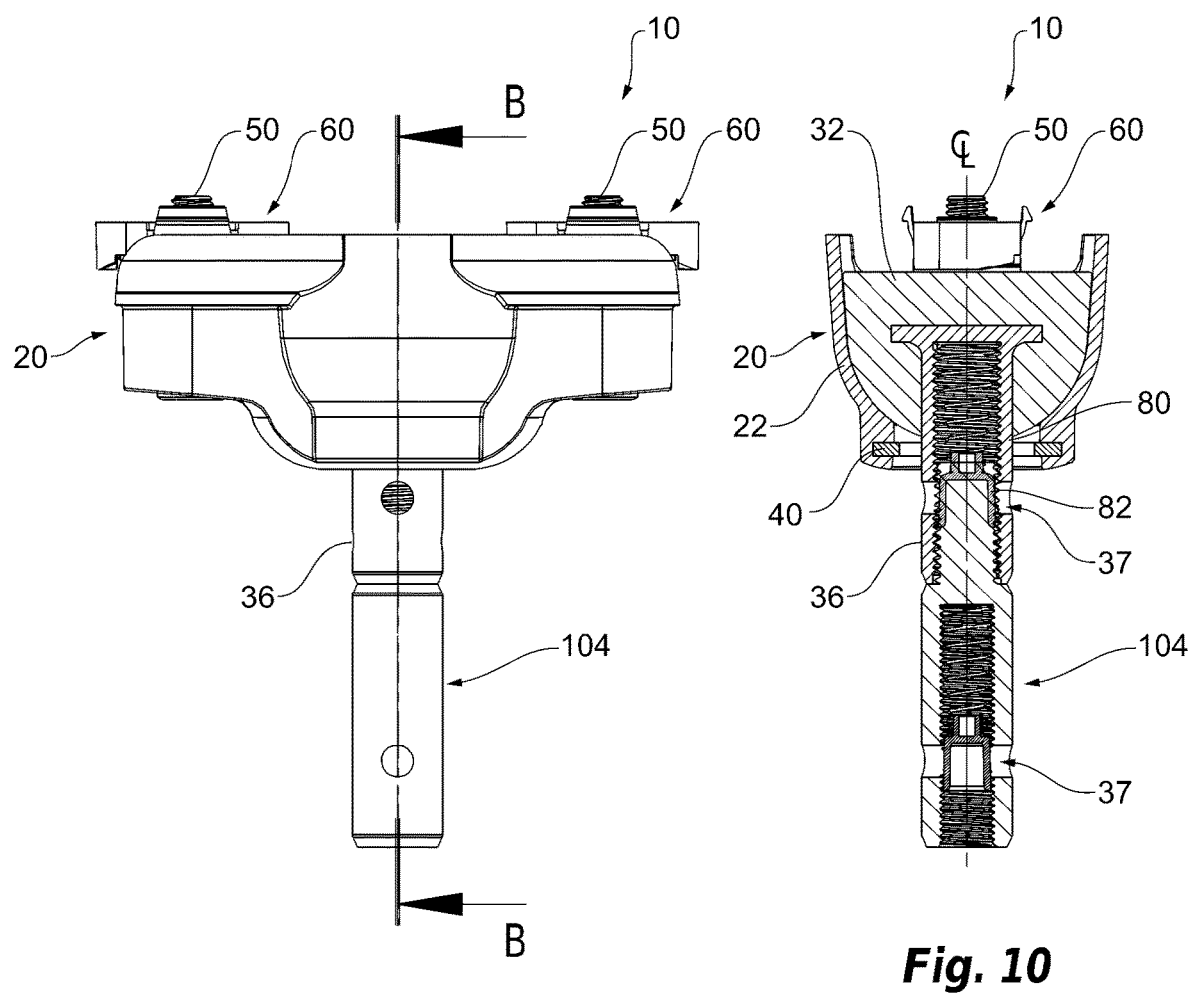
Fig. 8
Fig. 10
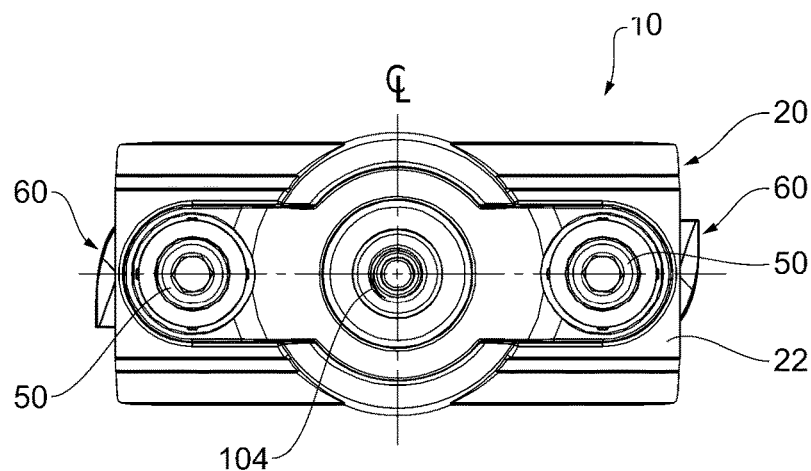
Fig. 9

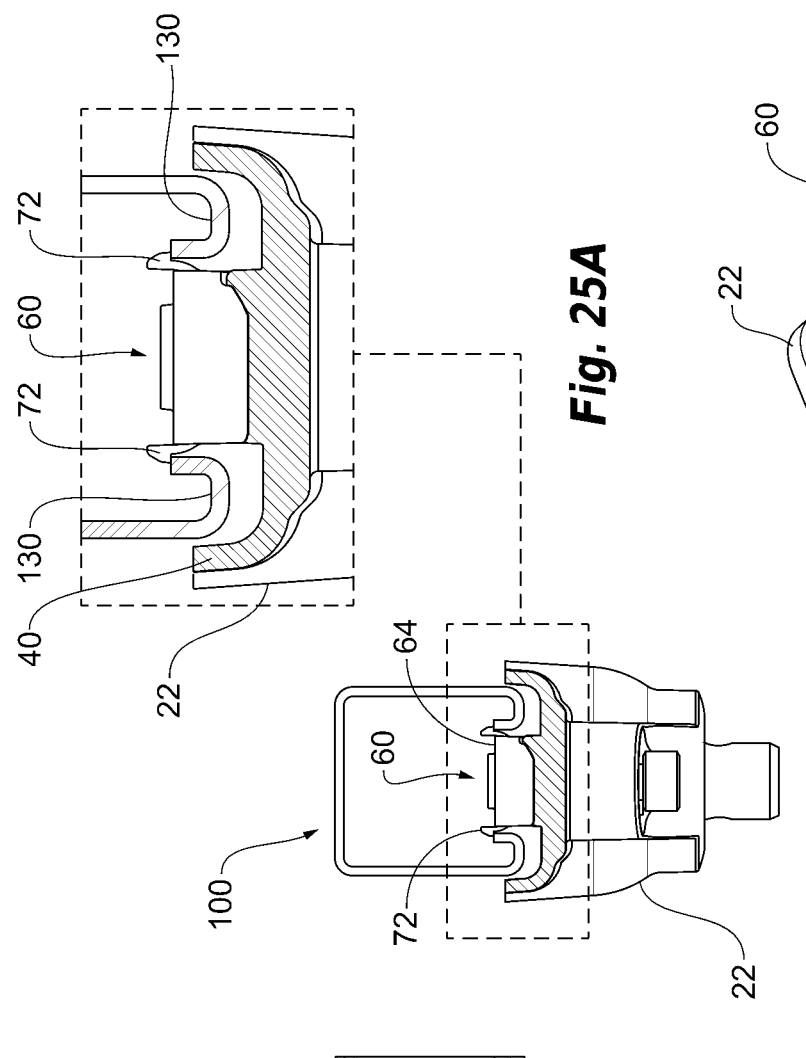
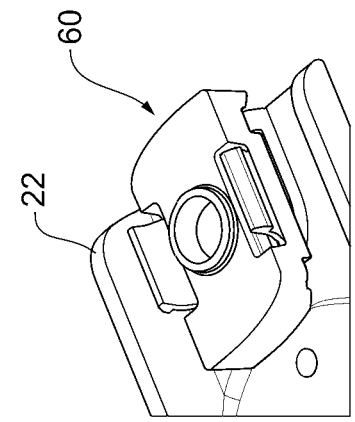
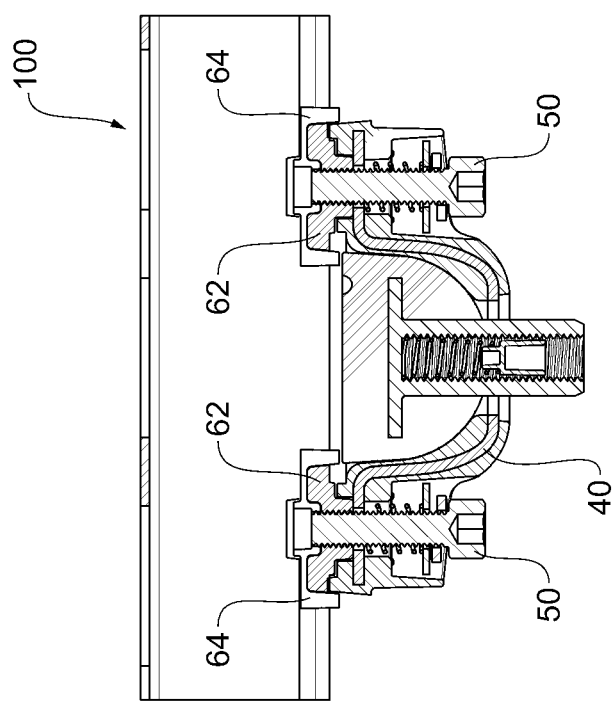

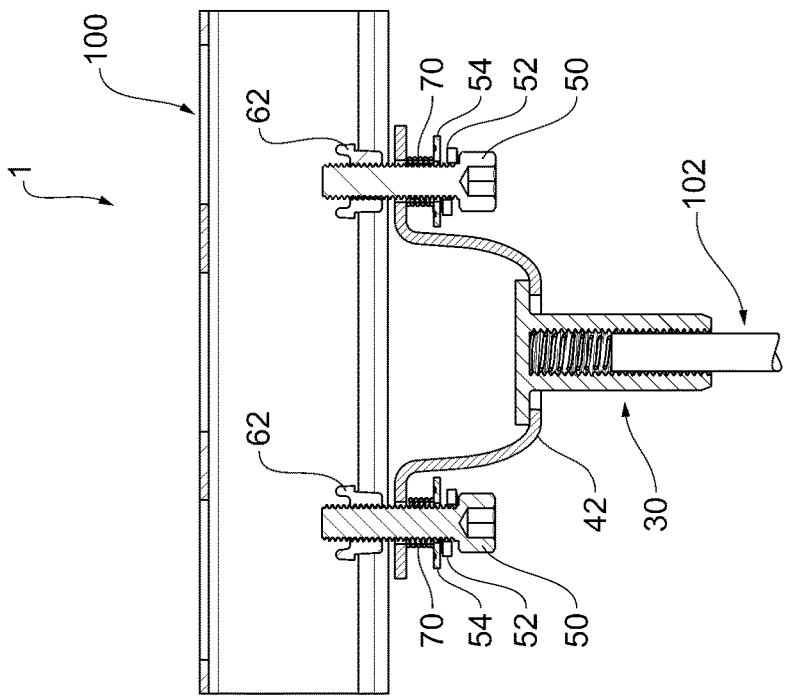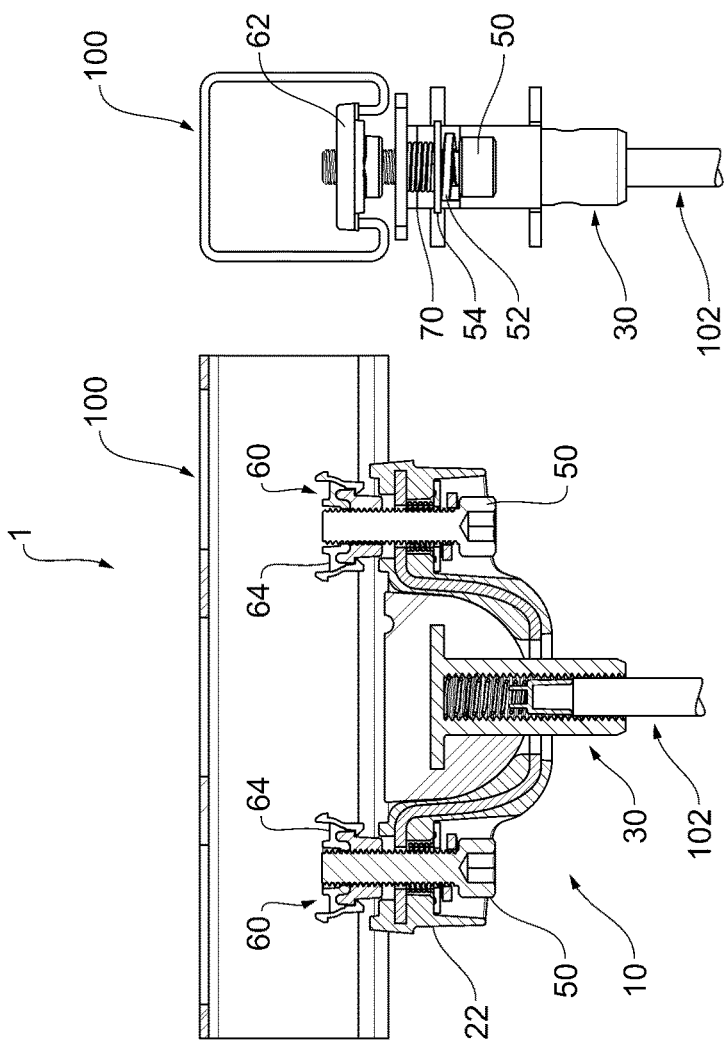

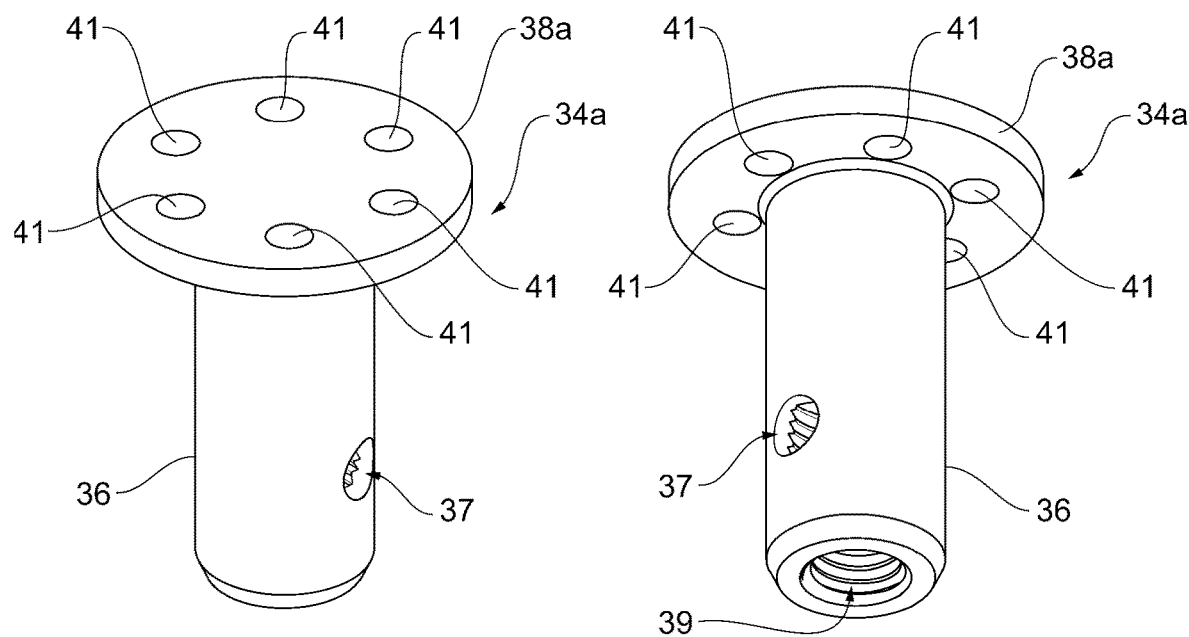
*Fig. 30*  *Fig. 31*
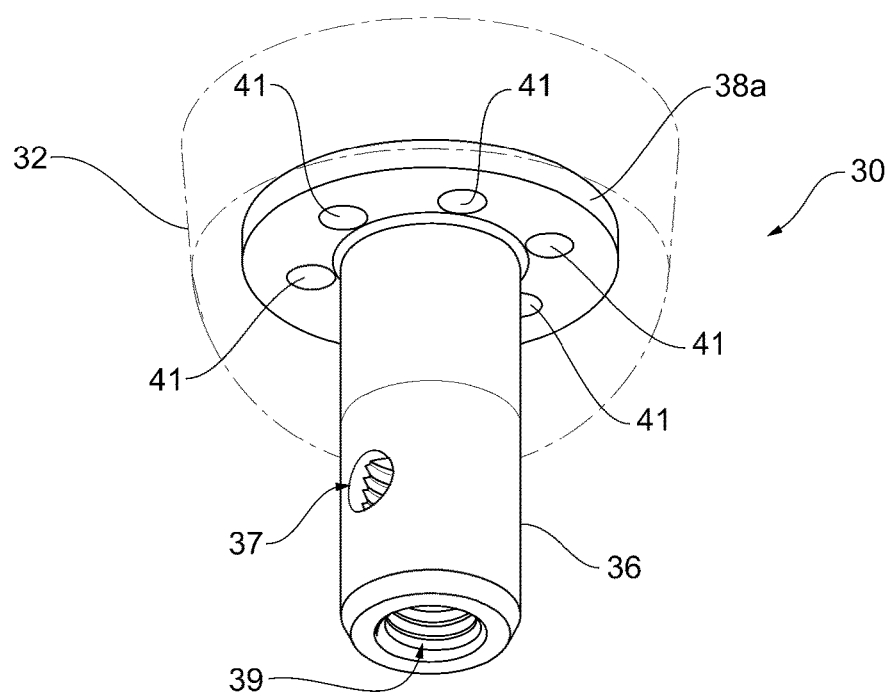
*Fig. 32*

TENSION MOUNT IMPROVEMENTS

PRIORITY DOCUMENTS

This application is a National Stage of International Application No. PCT/AU2021/000042, filed Jun. 30, 2021, which claims priority from Australian Provisional Patent Application No. 2020902257, titled "TENSION MOUNT IMPROVEMENTS," and filed on 2 Jul. 2020, the contents of which are hereby incorporated by reference in their entirety.

TECHNICAL FIELD

The present disclosure relates to a tension or hanging mount for engineering services. In a particular form, the present disclosure relates to a mount assembly for components of heating, ventilating, and air-conditioning (HVAC) systems.

BACKGROUND

An air handling space in a building is a space between a structural ceiling and a dropped (or hung) ceiling. The air handling space is useful for housing components of heating, ventilating, and air-conditioning (HVAC) systems, such as those that provide pathways for and control of either heated/conditioned or return airflows, as well as electrical and data cabling and lighting equipment.

Thus there is a need to suspend this equipment from suitable tension or hanging mounts which depend from the structural ceiling.

In the event of seismic activity such as a tremor or an earthquake, it is critical that these tension mounts do not fail, and drop this equipment onto people below.

One means via which seismic resistance can be designed into these mounts is the use of cushioning or resilient materials between rigid components, to aid with the absorption of the shock loads and vibrations associated with seismic events.

A short coming of these cushioning or resilient materials is that they are generally flammable, meaning they can be consumed by fire, potentially resulting in failure of tension or hanging mounts, and the dropping of equipment suspended therefrom.

It is against this background and the problems and difficulties associated therewith that the present invention has been developed.

Certain objects and advantages of the present disclosure will become apparent from the following description, taken in connection with the accompanying drawings, wherein, by way of illustration and example, aspects of the present invention are disclosed.

SUMMARY

According to a first aspect, there is provided a tension mount assembly comprising at least a base portion and a mount portion which depends from the base portion by hanging, wherein each of the base portion and the mount portion comprise a substantially rigid, non-flammable structural support element, and wherein at least one of these substantially rigid, non-flammable structural support elements is at least partially covered in a cushioning material in regions at or near to where the base portion and the mount portion are in contact with each other, and wherein in use, the mount portion is not dropped by the base portion even if the cushioning materials are consumed by a fire.

In one form, each of the substantially rigid, non-flammable structural support elements is at least partially covered in a cushioning material in regions at or near to where the base portion and the mount portion are in contact with each other.

In one form, the base portion comprises a body comprising an upperside and an underside, the upperside comprising a socket of a rounded shape formed therein, and the body further comprising a through aperture in the socket extending between the upperside and the underside of the body, the mount portion comprising an end portion comprising a bulbous shape, and a stem extending from the end portion, wherein the end portion of the mount portion nests in the socket of the base portion while the stem extends through the through aperture in the socket, the through aperture being sized to provide a clearance around the stem but too small for the bulbous shape to pass through.

In one form, the bulbous shape of the end portion of the mount portion comprises the shape of at least a portion of a sphere.

In one form, in an alternative, the bulbous shape is not spherical, but generally rounded. In one form then, the bulbous shape might be elliptical. In one form, the bulbous shape might be asymmetric.

In one form, the socket comprises a hemispherical shape.

In one form, the base portion further comprises a pair of bolt holes extending therethrough between the upperside and the underside of the body, there being one bolt hole to either side of the socket.

In one form, the mount portion comprises a rigid body comprising the stem, and an enlarged end portion so sized as to be unable to pass through the through aperture in the socket, and encapsulated in a cushioning material which is shaped to provide the bulbous form of the end portion of the mount portion.

In one form, the rigid body of the mount portion is formed from a non-flammable material.

In one form, the mount assembly further comprises a pair of bolts, and for each bolt a nut, where the bolts extend shank-first from an underside of the body of the base portion through the bolt holes, and where each bolt is secured by a nut positioned on the upperside of the body of the base portion.

In one form, the base portion comprises a load bearing support encapsulated in a cushioning material, both of which are shaped to provide the socket and through aperture.

In one form, the load bearing support of the base portion is formed from a non-flammable material.

In one form, the mount assembly further comprises a compression spring disposed over the shank of each of the bolts and between the head of each bolt and the load bearing support for the base portion.

The cushioning material comprises at least some cushioning properties. In one form, the cushioning material has at least some resilience. In one form, the cushioning material has at least some elastic properties.

According to a further aspect, there is provided a mount assembly comprising at least a base portion and a mount portion, wherein the base portion comprises a body comprising a load bearing support of non-flammable material encapsulated in a cushioning material, both of which cooperatively form a through aperture extending between an upperside and an underside of the body, and wherein the mount portion comprises a rigid body of non-flammable material comprising an enlarged end portion so sized as to be unable to pass through the through aperture in the base portion while the stem does so from the upperside with clearance therearound, and wherein at least the enlarged end portion of the mount portion is encapsulated in a cushioning material.

In one form, the enlarged end portion of the mount portion comprises a bulbous shape, and a stem extending from the end portion.

In one form, the body of the base portion comprises an upperside and an underside, the upperside comprising a socket of at least a hemispherical shape formed therein.

According to a further aspect, there is provided a mounting assembly comprising the above described mount assembly, and a rail upon which the base of the mount assembly is adapted to slide.

In one form, the rail comprises a channel comprising a slot. In one form, both the channel and the slot extend in a direction of elongation of the rail.

In one form, the rail comprises a floor, a pair of opposing sides, and an inwardly directed lip depending from each of the opposing sides.

In one form, the rail comprises a metal channel.

In one form, each of the nuts of the mount assembly is adapted to slidably engage in the slot of the rail so that the mount assembly is retained by the rail but able to slide therealong.

In one form, each of the nuts comprises a rectilinear planform body of a non-flammable material, the body comprising a pair of end edges, a pair of longer side edges, an upperside, an underside, a boss on the underside, and a threaded through hole extending between the upperside and the underside and through the boss for receiving the shank of one of the bolts.

In one form, each of the nuts comprises a stepped recess extending along the shorter side edges on the underside of the nut body.

In one form, the end edges of the nut body are shorter than the slot defined between the lips of the rail is wide, whereas the longer side edges are longer than the slot defined between the lips of the rail is wide.

In one form, for each nut there is a nut cover.

In one form, each nut cover comprises a body of a plastic material which is adapted to nest over the top of the nut, and retain the nut.

In one form, an underside of the nut cover comprises a recess sized and shaped to receive the nut therein, where each of the longer side edges of this recess comprise a retaining lip, which in use, is received with a snap-fit in a receiving groove provided along an underside, longer side edge of the nut.

In one form, in an alternative, the nut cover is overmolded onto the nut.

In one form, each of the upperside, longer side edges of the nut cover comprises one of a pair of upwardly and outwardly extending cantilever snaps extending upwardly therefrom.

In one form, the cantilever snaps can be employed to engage the nut assemblies with the lips of the rail for the purpose of temporarily suspending the mount assembly from the rail via the cantilever snaps during installation.

In one form, the stem of the mount portion comprises a blind hole extending inwardly from a stem end which is distal to the end plate, where inside of this blind hole there is retained a compression spring from which there depends an indicator cap that is visible through an inspection aperture in the stem when the compression spring is unloaded.

For ease of description, the mount and mounting assemblies embodying the present invention are described below in their usual assembled position as shown in the accompanying drawings and terms such as front, rear, upper, lower, horizontal, longitudinal etc., may be used with reference to this usual position. However, the mount and mounting assemblies may be manufactured, transported, sold, or used in orientations other than that described and shown here.

BRIEF DESCRIPTION OF DRAWINGS

Forms of the present disclosure will be discussed with reference to the accompanying drawings wherein:

FIG. 4 is a side view of the mounting assembly of FIG. 1;

FIG. 5 is an end view of the mounting assembly of FIG. 1, and FIG. 5a is a detail view taken from this FIG. 5;

FIG. 8 is a side view of the mount assembly;

FIG. 9 is an underside view of the mount assembly;

FIG. 10 is a cross-sectional view taken at B-B of FIG. 8;

FIG. 24 is a cross-sectional view through the mounting assembly illustrating the nut assemblies in their insertion position;

FIG. 25 is an end view of the mounting assembly illustrating the nut assemblies in their insertion position;

FIG. 25a is a detail end view of the nut assembly in its insertion position relative to the rail;

FIG. 25b is a detail isometric view of the nut assembly in its insertion position relative to the rail:

FIG. 27 is a cross-sectional view through the mounting assembly illustrating the nut assemblies in their in-use position;

FIG. 28 is an end view of the mounting assembly as it may appear post a fire event;

FIG. 29 is a side view of the mounting assembly as it may appear post a fire event;

FIGS. 30 and 31 are isometric views of a mount rigid portion according to a further form; and FIG. 32 is an isometric view of a mount portion comprising the rigid portion of FIGS. 30 and 31.

In the following description, like reference characters designate like or corresponding parts throughout the figures.

DESCRIPTION OF EMBODIMENTS

Figure 1:
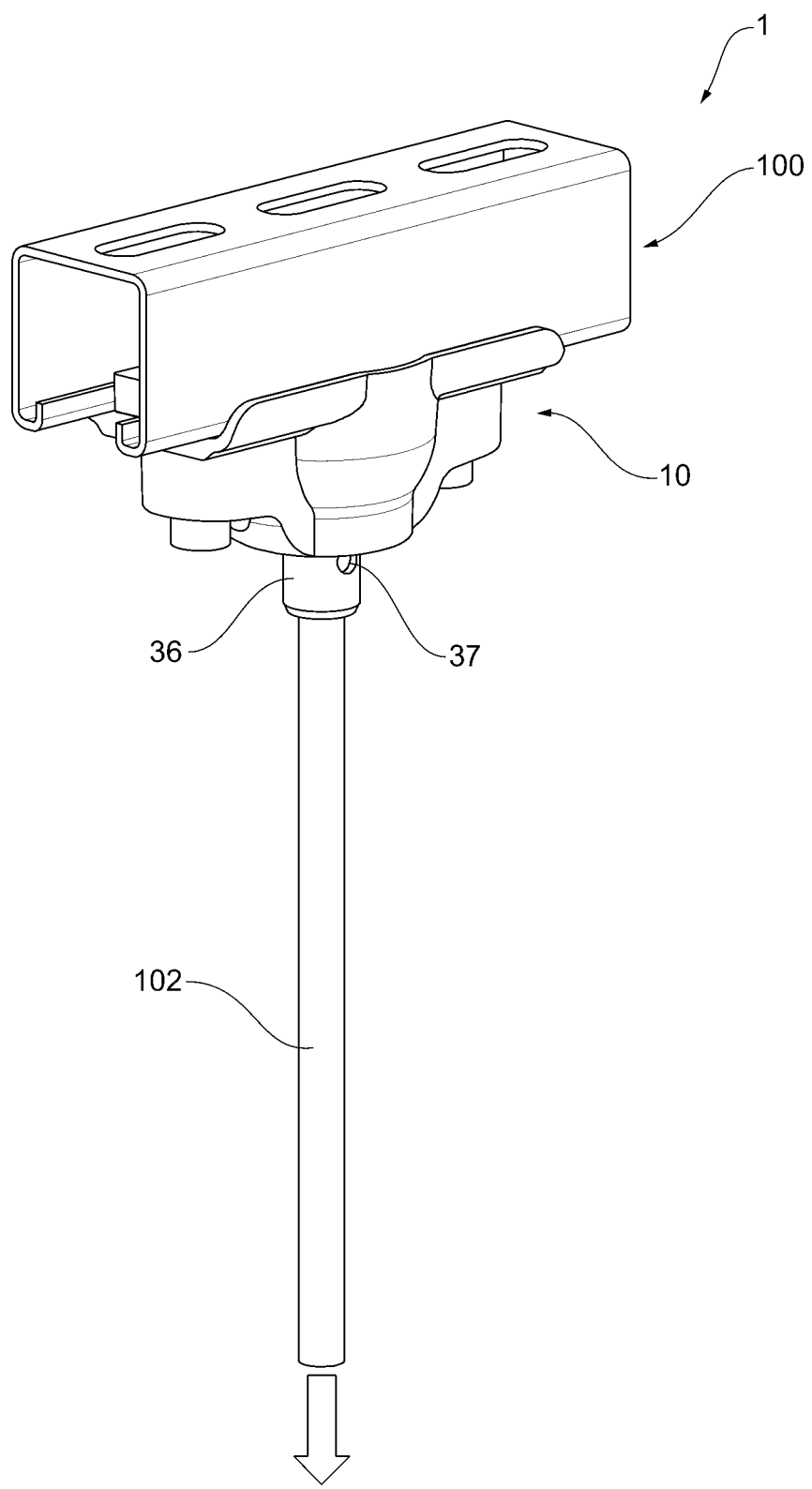
FIG. 1 is an isometric view of a tension mounting assembly comprising a rail and a tension mount assembly, the mounting assembly being viewed from an underside.

Referring now to FIG. 1, there is illustrated a mounting assembly 1 comprising a mount assembly 10, and a rail 100 (only a portion of a length of which is illustrated) for securement with respect to a structural ceiling, and from which the mount assembly 10 depends (by hanging), and with respect to which a base portion 20 of the mount assembly 10 is adapted to slide, so that the mount assembly 10 can be positioned therealong as required.

Figure 2:
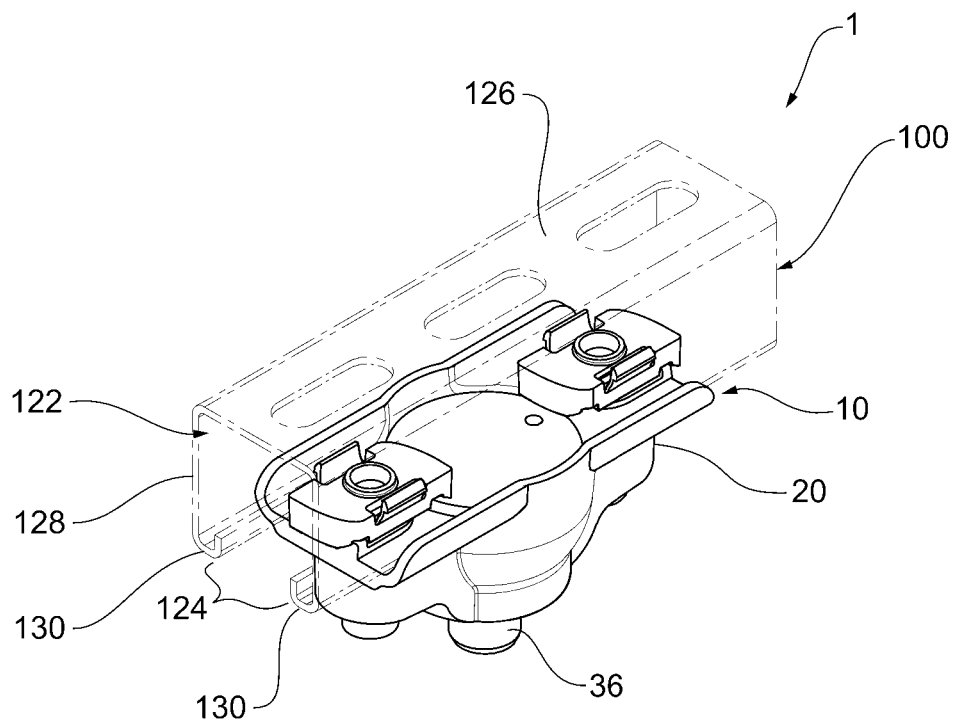
FIG. 2 is an isometric view of the mounting assembly of FIG. 1, viewed from an upperside.
Figure 3:
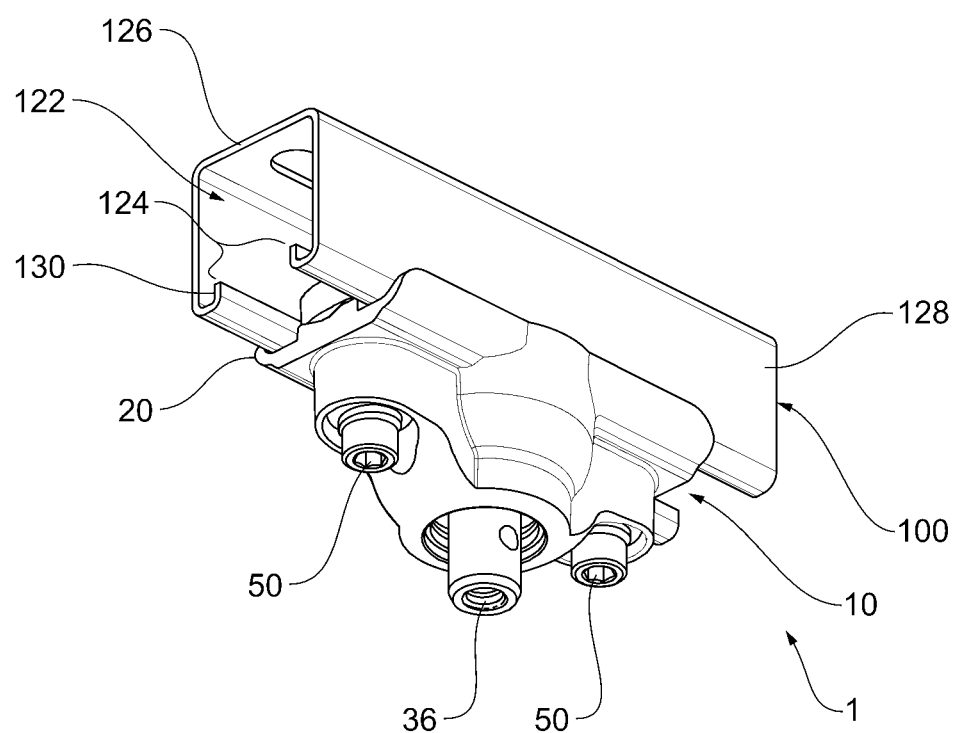
FIG. 3 is an isometric view of the mounting assembly of FIG. 1, viewed from an underside.

With reference to FIGS. 2 and 3, it can be seen that the rail 100 comprises a channel 122 comprising a slot 124, and a substantially constant cross-sectional shape throughout its length. This cross-sectional shape comprises a base 126, a pair of opposing sides 128, and an inwardly directed and downwardly curled lip 130 depending from each of the opposing sides 128.

Figure 6:
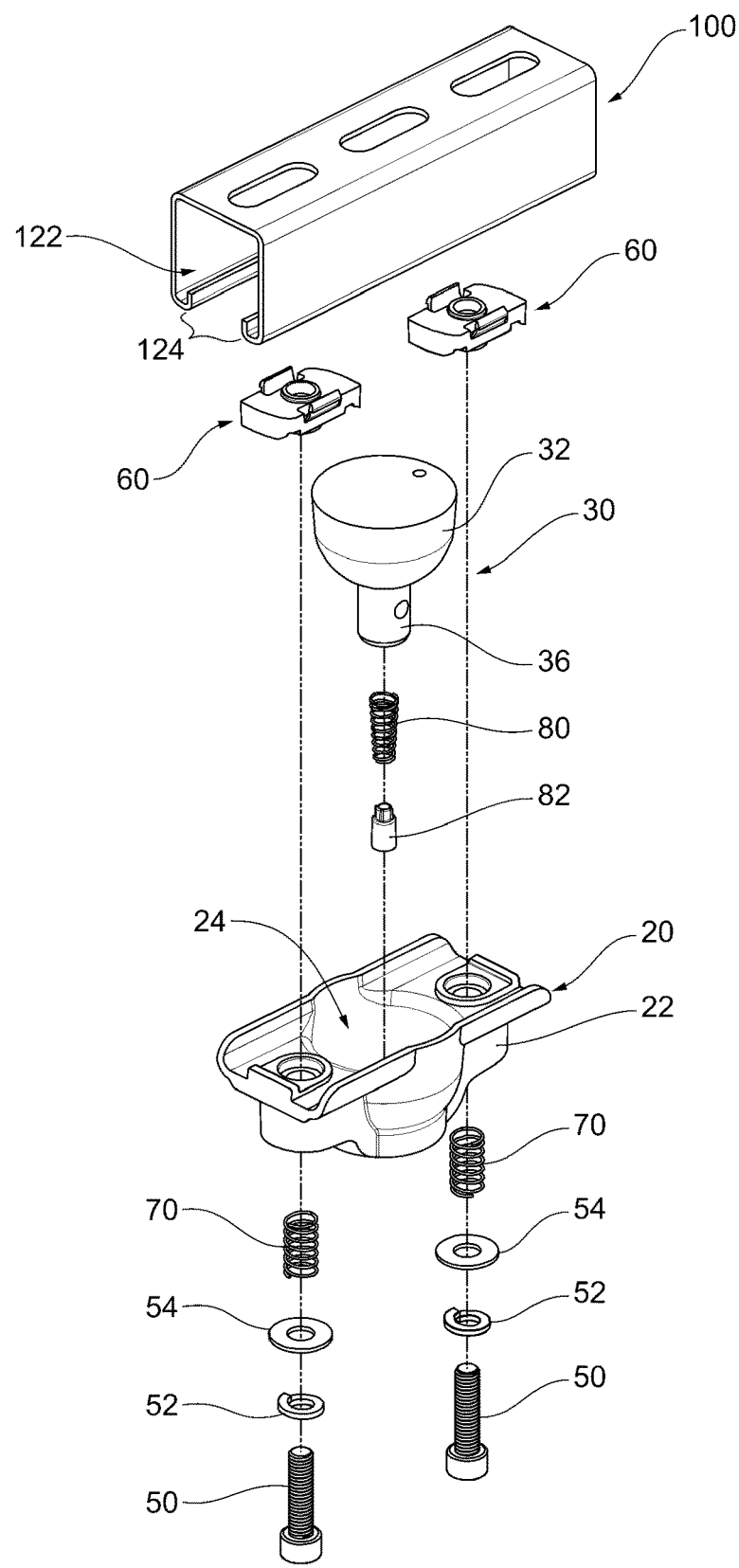
FIG. 6 is an exploded view of the mounting assembly.
Figure 7:
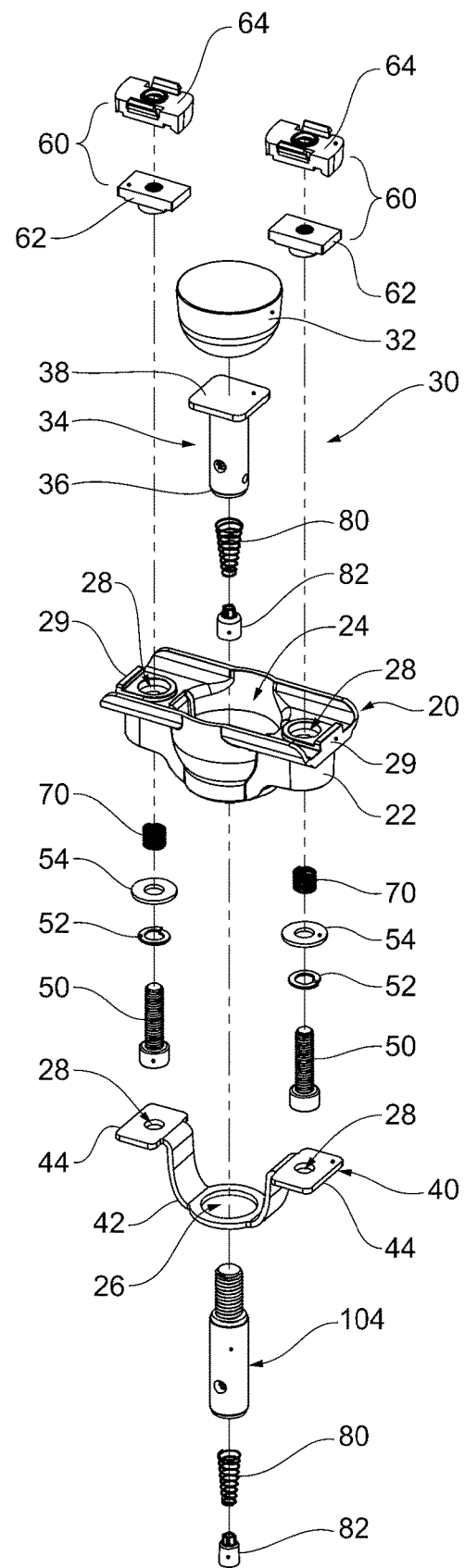
FIG. 7 is an exploded view of the mount assembly.

The mount assembly 10 comprises at least the base portion 20 and a mount portion 30 (see FIGS. 6 and 7). A mounting rod 102 for a load will either depend from the mount portion 30 directly, or via an adaptor 104 for a mounting rod of a different size.

The base portion 20 comprises a body 22 comprising an upperside and an underside, the upperside comprising a socket 24 of bulbous shape, and more particularly a hemispherical shape in this case formed therein, and the body 22 further comprising a through aperture 26 in the socket 24 extending between the upperside and the underside of the body 22. Body 22 further comprises a pair of side skirts 27, which in use, extend on either side of the rail 100, to resist rotation of the body 22 relative to the rail 100, and increase stability of the mount assembly 10.

The base portion 20 further comprises a load bearing support 40 encapsulated in a cushioning material (in this case a polyamide) from which the body 22 is formed, both of which cooperatively form the through aperture 26 extending between the upperside and the underside of the body 22.

The load bearing support 40 for the base portion 20 comprises a rigid, non-flammable metal bracket, the load bearing support 40 comprising a central portion 42 of a U-shape, and a pair of side tabs 44 extending to either side of the central portion 42. The U-shaped central portion 42 extends beneath the socket 24, and the side tabs 44 extend to either side of the socket 24.

The mount portion 30 comprises an end portion 32 having a bulbous shape, and more particularly a hemispherical shape in this case, and a stem 36 extending from the end portion 32.

The mount portion 30 further comprises a rigid, non-flammable body 34 of metal in this case, the rigid body 34 comprising the stem 36, which transitions via a radius fillet into an enlarged end portion 38, in this case an end plate 38, so sized as to be unable to pass through the through aperture 26 in the base portion 20 while the stem 36 does so. The end plate 38 and a portion of the stem 36 are encapsulated in a cushioning material (in this case a rubber), where it is this cushioning material that forms the bulbous end portion 32.

The end portion or plate 38 comprises a rectilinear planform, for the purpose of providing a resistance to rotation of the rigid body 34 with respect to the end portion 32.

Referring now to FIGS. 30 through 32, there is illustrated a rigid body 34a for the mount portion 30, according to a further, alternate form. In this case, the end plate 38a is circular (as distinct from rectilinear end plate 38) comprising a plurality of apertures 41 therethrough (although one may suffice). In use, the cushioning material that forms the bulbous end portion 32 is moulded through the apertures 41, for the purpose of providing a resistance to rotation of the rigid body 34a with respect to the end portion 32.

Figure 26:
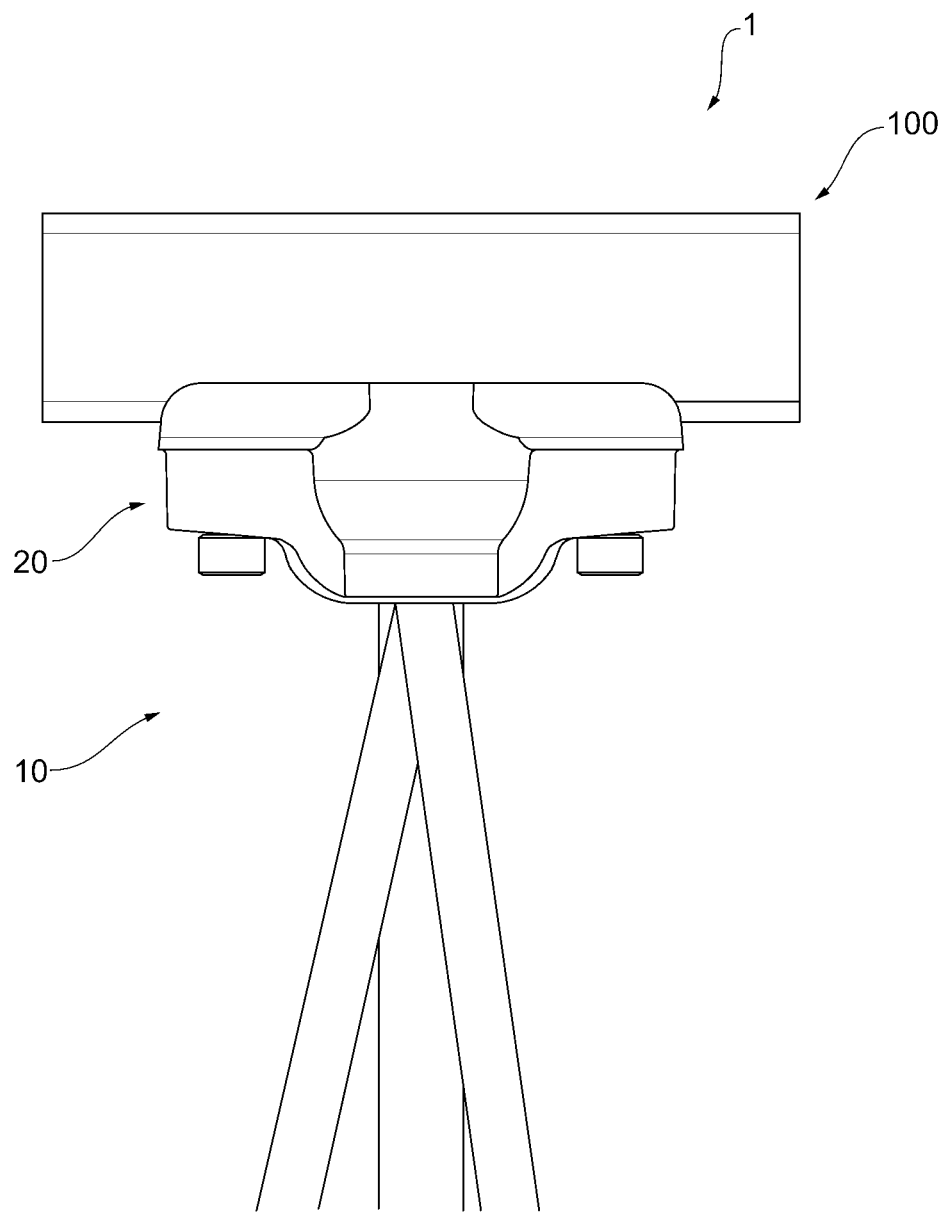
FIG. 26 is a side view of the mounting assembly illustrating a range of movement of the stem of the mount portion in the case of a seismic event.

In use, the bulbous end portion 32 of the mount portion 30 nests in the socket 24 of the base portion 20 while the stem 36 extends through the through aperture 26 in the socket 24, the through aperture 26 being sized to provide a clearance around the stem 36. Advantageously, this ball in socket arrangement will permit a considerable range of relative pivoting movement between the mount portion 30 and the base portion 20 of the mount assembly 10 (as illustrated in FIG. 26), where this relative pivoting movement will aid the ability of the mounting assembly 1 to move with and thus withstand seismic events without failing in the way a rigid part might.

Moreover, by forming each of the base portion 20 and the mount portion 30 using cushioning materials over-moulded on structural elements, the mount assembly 10 will aid in the absorption of shock and vibration, further aiding performance during seismic events.

Referring now to FIGS. 28 and 29, in the event of a fire, these cushioning materials may be burned away, but even if they are, the end plate 38 of the non-flammable mount portion 30 will be retained by the non-flammable load bearing support 40 of the base portion, on account of it being too large to pass through the through aperture 26, and thus preventing the load hanging from the mount portion 30 from being dropped by the mounting assembly 1.

The base portion 20 further comprises a pair of bolt holes 28 extending therethrough between the upperside and the underside of the body 22, there being one bolt hole 28 to either side of the socket 24. These bolt holes 28 extend through both the cushioning material, and the side tabs 44 of the load bearing support, or bracket 40.

The mount assembly 10 further comprises a pair of bolts 50, and for each bolt a nut assembly 60, where the bolts 50 extend shank-first from an underside of the body 22 of the base portion 20 through the bolt holes 28, and where each bolt 50 is secured by a nut assembly 60 positioned on the upperside of the body 22 of the base portion 20. Each of a spring washer 52, a flat washer 54 and a compression spring 70 is disposed over the shank of each of the bolts 50 and between the head of each bolt 50 and the load bearing support 40 for the base portion 20.

Figure 21:
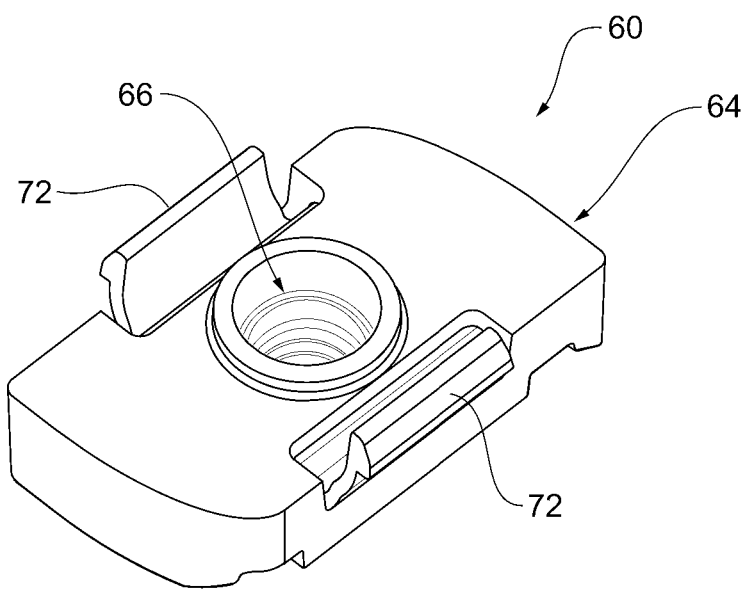
FIG. 21 is an isometric view of a nut assembly viewed from an upperside.
Figure 22:
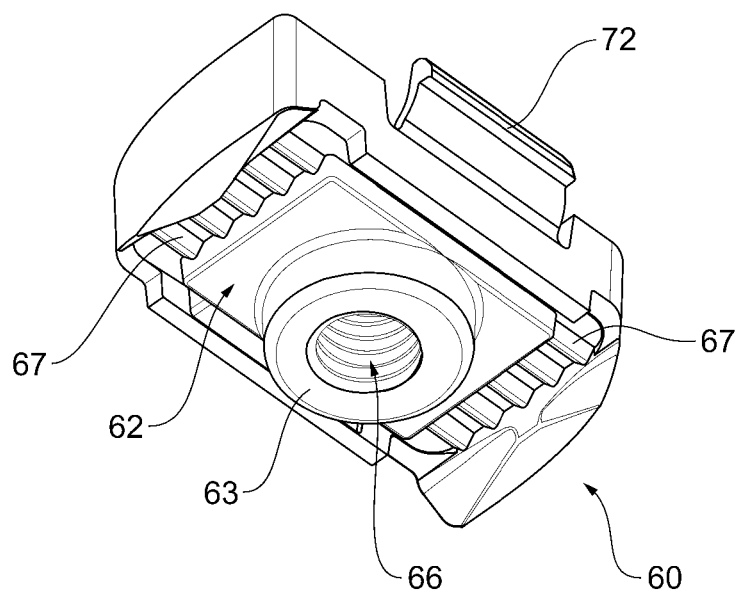
FIG. 22 is an isometric view of the nut assembly viewed from an underside.
Figure 23:
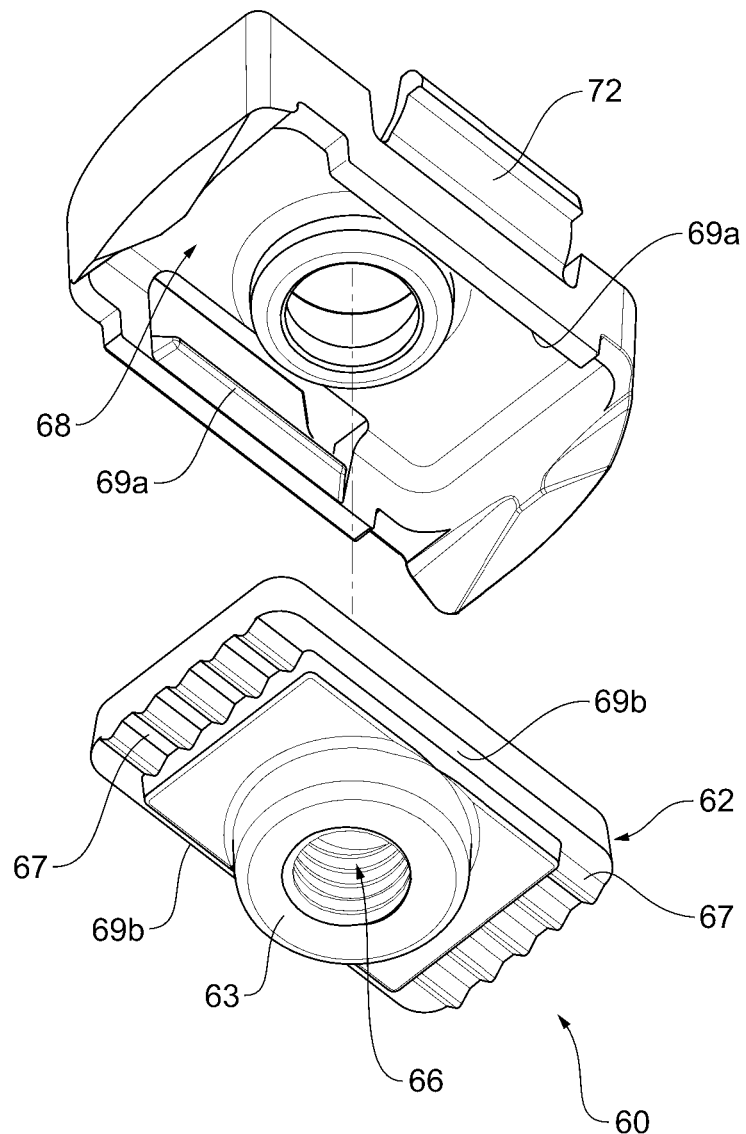
FIG. 23 is an exploded view of the nut assembly.

With reference to FIGS. 21 through 23, each of the nut assemblies 60 comprises a nut 62, and a nut cover 64.

Each of the nuts 62 comprises a rectilinear planform body of metal, the body comprising a pair of end edges, a pair of longer side edges, an upperside, an underside, a boss 63 on the underside, and a threaded through hole 66 extending between the upperside and the underside and through the boss 63 for receiving the shank of one of the bolts 50. Each of the nuts 62 comprises a stepped recess 67 extending along the shorter side edges on the underside of body of the nut 62. As can be seen in FIG. 23, the underside of the nut 62 comprises rows of teeth to help it grip onto the rail 100 when the nut 62 and bolt 50 is tightened during assembly.

The end edges of the body of the nut 62 are shorter than the slot 124 defined between the lips 130 of the rail is wide, whereas the longer side edges are longer than the slot 124 defined between the lips 130 of the rail 100 is wide.

Each nut cover 64 comprises a body of a plastic material which is adapted to nest over the top of the nut 62, and retain the nut 62. An underside of the nut cover 64 comprises a recess 68 sized and shaped to receive the nut 62 therein, where each of the longer side edges of this recess comprise a retaining lip 69a, which in use, is received with a snap-fit in a receiving groove 69b provided along an underside, longer side edge of the nut 62, and which is adapted for this purpose accordingly. Optionally, the nut cover 64 could be overmolded onto the nut 62.

Each of the upperside, longer side edges of the nut cover 64 comprises one of a pair of upwardly and outwardly extending cantilever snaps 72 extending upwardly therefrom.

The slightly elongated dimensioning of the nut assembly 60 means that when the nut assemblies 60 are orientated such that their direction of elongation is aligned with the direction of elongation of the slot 124, then the nut assembly 60 can be inserted into the slot 124 and pass between the lips 130 of the rail 100. This orientation will hereinafter be referred to as an insertion position of the nut assemblies 60.

Figure 19:
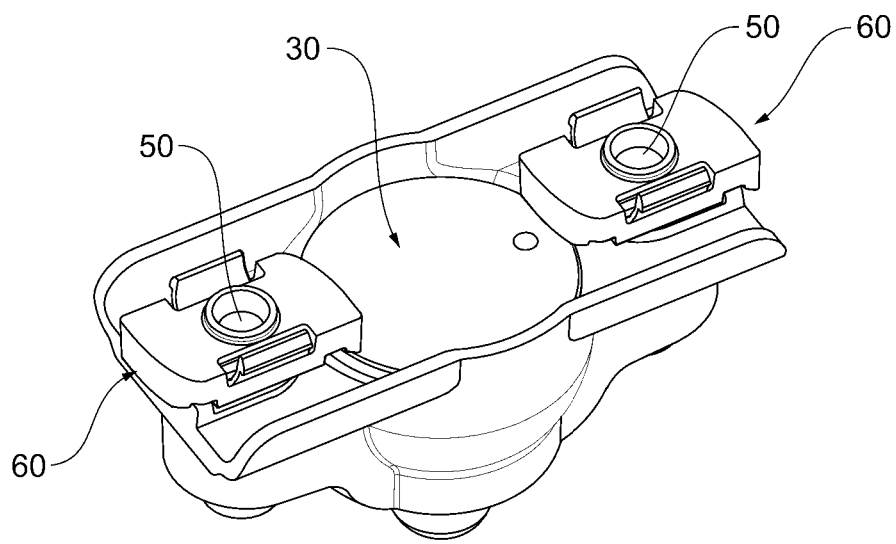
FIG. 19 illustrates the nut assemblies in their insertion position.
Figure 20:
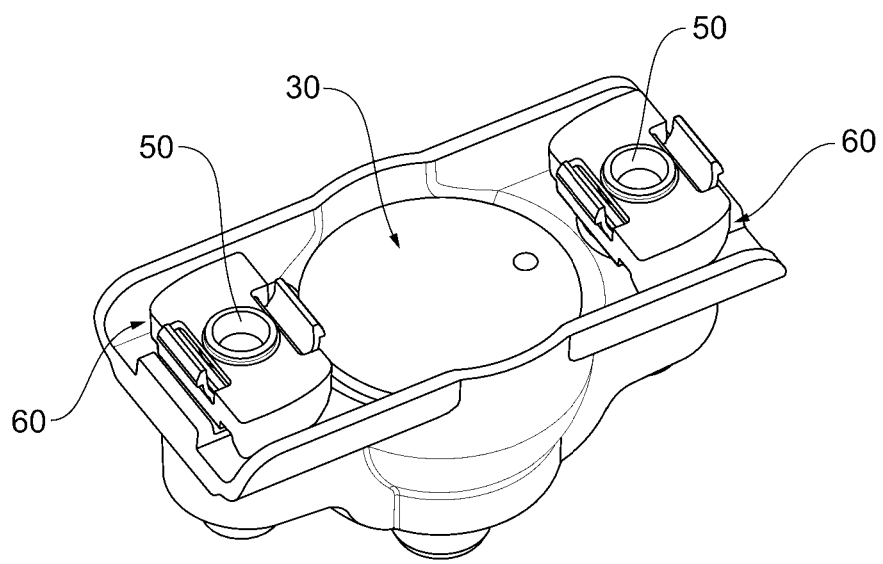
FIG. 20 illustrates the nut assemblies in their engagement, or 'in-use' position.

With reference to FIGS. 19, 25 and 25a, it can be seen that when in the insertion position, the cantilever snaps 72 can be employed to engage the nut assemblies 60 with the lips 130 of the rail 100 for the purpose of temporarily suspending the mount assembly 10 from the rail 100 via the cantilever snaps 72 during installation. This means that an installer need not have one hand tied up supporting the mount assembly 10 for longer than is necessary to snap-fit the cantilever snaps 72 between the lips 130 of the rail 100, and that the installer can have both hands free for completion of installation.

Figure 11:
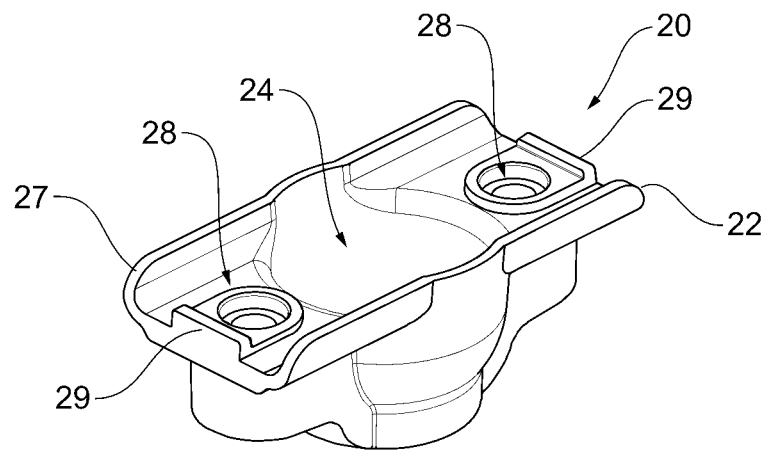
FIG. 11 is an isometric view of a base of the mount assembly viewed from an upperside.
Figure 12:
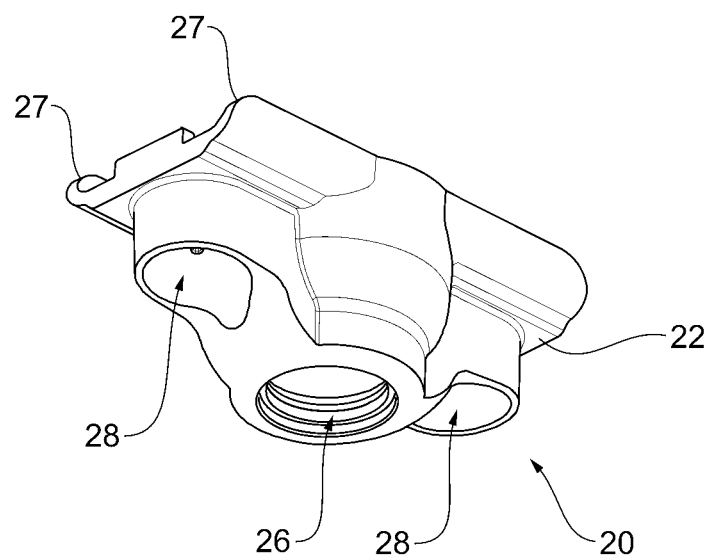
FIG. 12 is an isometric view of the base of the mount assembly viewed from an underside.
Figure 13:
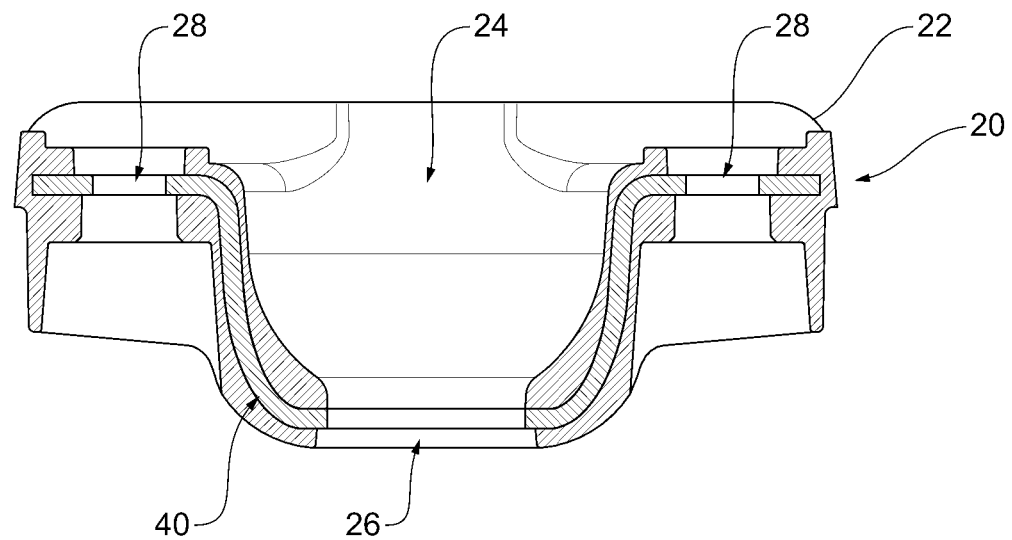
FIG. 13 is a cross-sectional view taken lengthwise through the mount assembly.
Figure 13A:
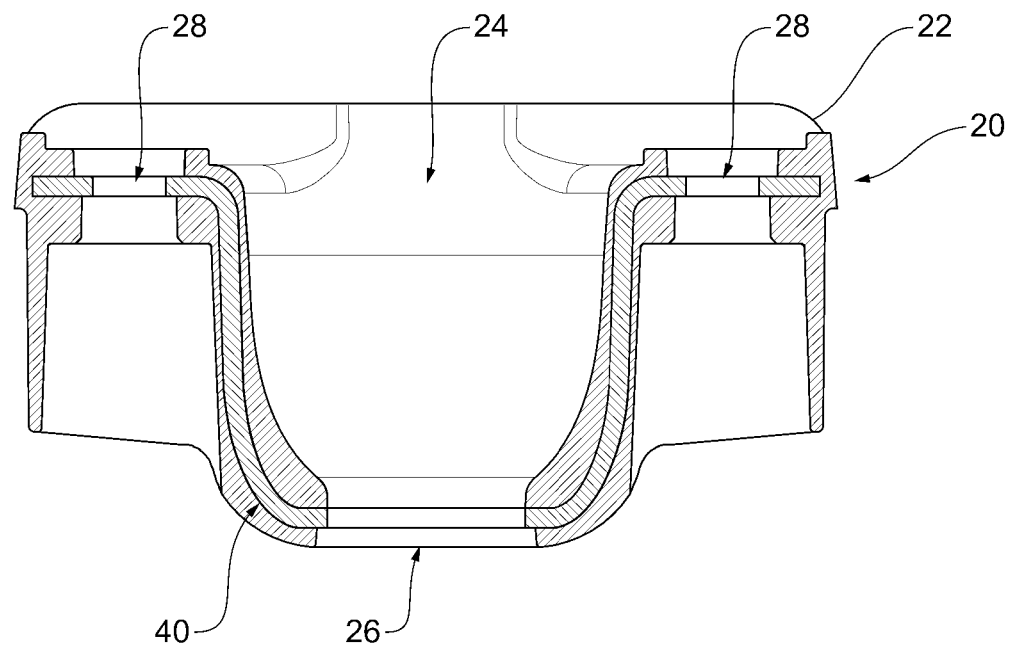
FIG. 13a is a cross-sectional view taken lengthwise through a mount assembly comprising a deeper socket than that of FIG. 13.
Figure 14:
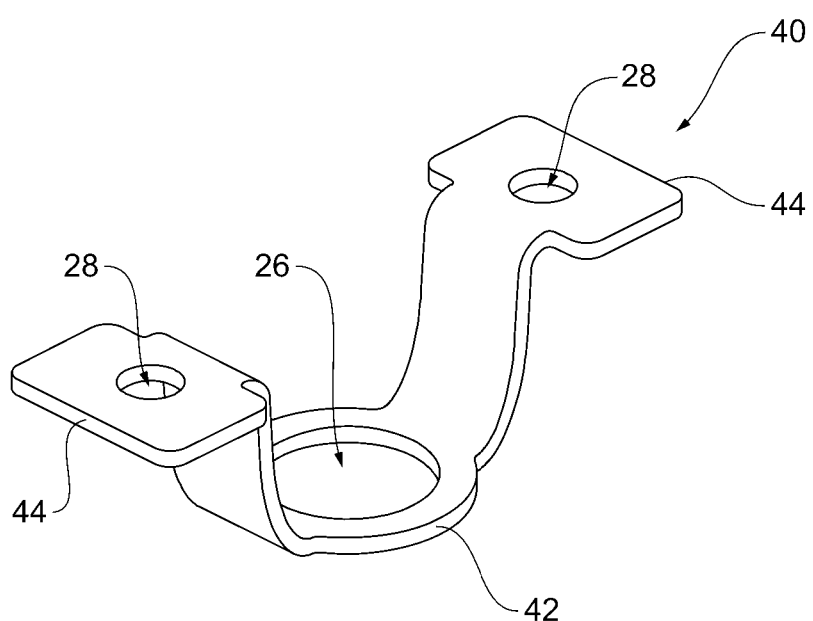
FIG. 14 is an isometric view of a load bearing support from the base of the mount assembly.
Figure 15:
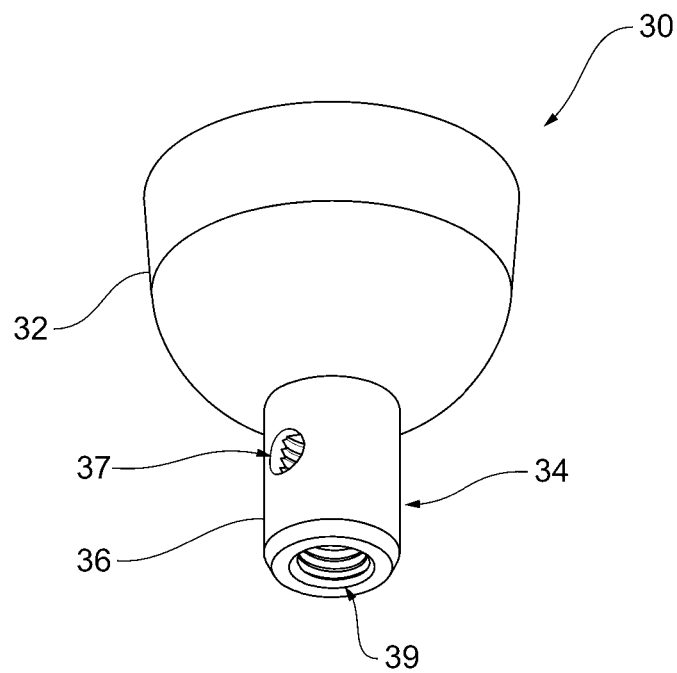
FIG. 15 is an isometric view of a mount portion of the mount assembly.
Figure 16:
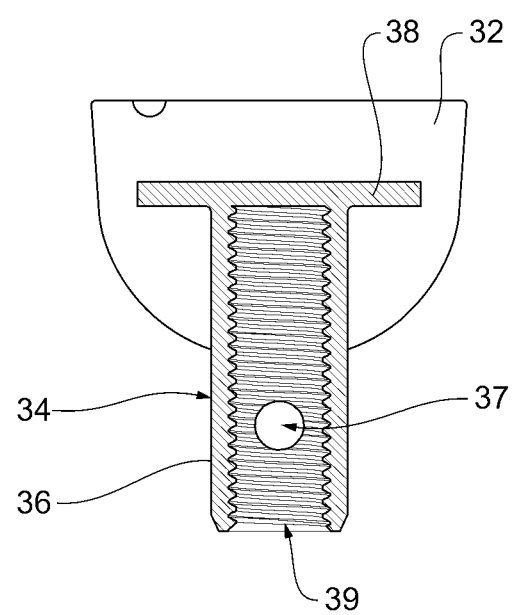
FIG. 16 is a cross-sectional view through the mount portion of the mounting assembly.
Figure 17:
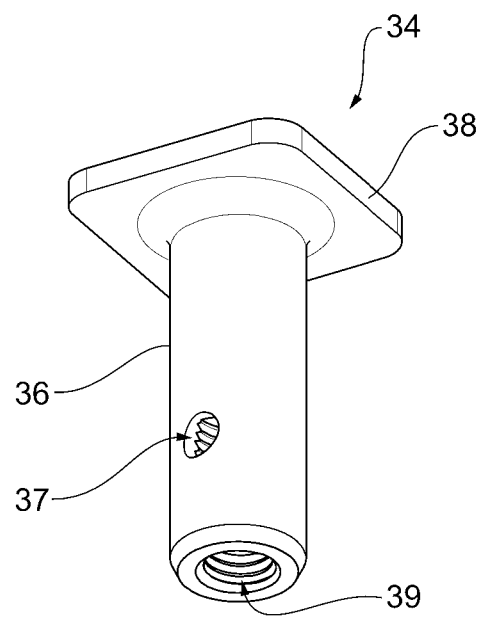
FIGS. 17 and 18 are isometric views of a rigid portion of the mount portion.
Figure 18:
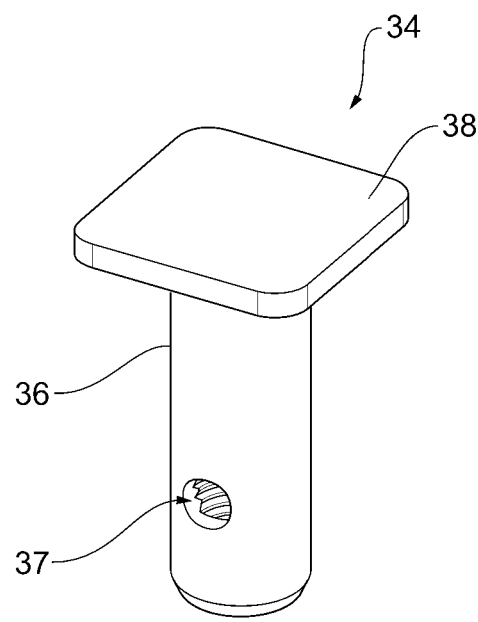

From this insertion position, each of the nut assemblies 60 can be rotated through 90° around the bolt 50 axis and using the boss 63 as a rotational guide, until they hit a stop 29 (see FIGS. 7 and 11), to a retained position (as illustrated in FIGS. 20, 27, 28 and 29) in which the stepped recesses 67 extending along the shorter side edges on the underside of the body of the nut 62 rest upon the lips 130 of the rail 100, ensuring a hanging, sliding retention of the mount assembly 10 to the rail 100.

With reference to FIGS. 28 and 29, in the event of a fire, the nut covers 64 may be burned away, but even if they are, the non-flammable nuts 62 will be retained by the non-flammable rail 100, thus preventing the load hanging from the mount portion 30 from being dropped by the mounting assembly 1.

Referring once again to the rigid body 34 of the mount portion 30, and to FIGS. 6 and 7. The stem 36 of the mount portion 30 is cylindrical, and comprises a blind hole 38 extending inwardly from a stem end which is distal to the end plate 38, where this blind hole 39 comprises a female (or internal) thread for receiving a male (or external) threaded end of either a hanging rod or an adapter 104. Inside of this blind hole 39 there is retained a compression spring 80, from which there depends an indicator cap 82. Preferably, the indicator cap 82 will be brightly coloured, so as to ensure that this is clearly visible through the inspection aperture 37. In use, as either of the hanging rod or adapter are threaded into the blind hole 39, the installer should continue to feed the threaded end of either the hanging rod or adapter into the stem end until the indicator cap 82 is no longer visible through the inspection aperture 37. In this way, the mount assembly 10 provides a means for indicating to the installer that either the hanging rod or adapter are sufficiently engaged as to be safe and secure in both seismic and fire events.

Where required, an adapter 104 can be employed to connect a hanging rod of different size to the stem 36 of the mount portion 30. Such an adapter 104 will comprises an elongate cylindrical body comprising a first end comprising a male thread sized to cooperate with the female thread inside of the stem 36, and a second, distal end comprising a blind hole 39 comprises a female (or internal) thread sized for receiving the threaded end of the dissimilarly sized hanging rod.

In the same way as the stem 36 of the mount portion 30, the adapter may comprise a compression spring 80, from which there depends an indicator cap 82 inside of the threaded blind hole 39. Similarly then, the adapter 104 provides a means for indicating to the installer that the hanging rod screwed into the adapter 104 is sufficiently engaged as to be safe and secure in both seismic and fire events.

It should be apparent that both the tension mount assembly and the tension mounting assembly, of which the mount assembly forms a part, are adapted to resist any failure which may result in dropping a load suspended therefrom in either or even both of a seismic and/or a fire event.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A tension mount assembly, comprising:
   at least a base portion; and
   a mount portion which depends from the base portion by hanging,
   wherein each of the base portion and the mount portion comprise a substantially rigid, non-flammable structural support element,
   wherein at least one of these substantially rigid, non-flammable structural support elements is at least partially covered in a cushioning material in regions at or near to where the base portion and the mount portion are in contact with each other,
   wherein the base portion comprises a body having an upperside and an underside,
   wherein the tension mount assembly further comprises:
      at least a pair of bolts, and for each bolt a nut, where the bolts extend shank-first from the underside of the body of the base portion through bolt holes, wherein each bolt is secured by one of the nuts positioned on the upperside of the body of the base portion; and
      a compression spring disposed over the shank of each of the bolts and between the head of each bolt and a load bearing support for the base portion, and
   wherein the upperside of the body of the base portion comprises a socket of rounded shape formed therein, and the body further comprising a through aperture in the socket extending between the upperside and the underside of the body, the mount portion comprising an end portion comprising a bulbous shape, and a stem extending from the end portion, wherein the bulbous end portion of the mount portion nests in the socket of the base portion while the stem extends through the through aperture in the socket, the through aperture being sized to provide a clearance around the stem but too small for the bulbous shape to pass through.

2. The tension mount assembly of claim 1, wherein the bulbous shape of the end portion of the mount portion comprises the shape of at least a portion of a sphere.

3. The tension mount assembly of claim 1, wherein there is at least one bolt hole to either side of the socket.

4. The tension mount assembly of claim 1, wherein the mount portion comprises a rigid body comprising the stem, and an enlarged end portion so sized as to be unable to pass through the through aperture in the socket, and encapsulated in the cushioning material which is shaped to provide the bulbous form of the end portion of the mount portion.

5. The tension mount assembly of claim 4, wherein the rigid body of the mount portion is formed from a non-flammable material.

6. The tension mount assembly of claim 1, wherein each of the nuts comprises a rectilinear planform body of a non-flammable material, the body comprising a pair of end edges, a pair of longer side edges, an upperside, an underside, a boss on the underside, and a threaded through hole extending between the upperside and the underside and through the boss for receiving the shank of one of the bolts.

7. The tension mount assembly of claim 6, wherein each of the nuts comprises a stepped recess extending along the shorter side edges on the underside of the nut body.

8. The tension mount assembly of claim 1, wherein for each nut there is a nut cover.

9. The tension mount assembly as in claim 8, wherein each nut cover comprises a body of a plastic material which is adapted to nest over the top of the nut, and retain the nut.

10. The tension mount assembly of claim 9, wherein an underside of the nut cover comprises a recess sized and shaped to receive the nut therein, where each of a pair of longer side edges of this recess comprise a retaining lip, which in use, is received with a snap-fit in a receiving groove provided along an underside, longer side edge of the nut.

11. The tension mount assembly of claim 9, wherein each of the upperside, longer side edges of the nut cover comprises one of a pair of upwardly and outwardly extending cantilever snaps extending upwardly therefrom.

12. The tension mount assembly of claim 4, wherein the stem of the mount portion comprises a blind hole extending inwardly from a stem end which is distal to the end plate, where inside of this blind hole there is retained a compression spring from which there depends an indicator cap that is visible through an inspection aperture in the stem when the compression spring is unloaded.

13. A tension mounting assembly, comprising:
    the tension mount assembly according to claim 1; and
    a rail upon which the tension mount assembly is adapted to slide.

14. The tension mounting assembly of claim 13, wherein the rail comprises a channel comprising a slot, and both the channel and the slot extend in a direction of elongation of the rail.

15. The tension mounting assembly of claim 14, wherein the rail comprises a floor, a pair of opposing sides, and an inwardly directed lip depending from each of the opposing sides.

16. The tension mounting assembly of claim 13, wherein each of the nuts of the mount assembly is adapted to slidably engage in the slot of the rail so that the mount assembly is retained by the rail but able to slide therealong.

17. The tension mounting assembly of claim 13, wherein the end edges of the nut body are shorter than the slot defined between lips of the rail is wide, whereas a pair of longer side edges are longer than the slot defined between the lips of the rail is wide, so the nut can pass through the slot when its direction of elongation is aligned with a direction of elongation of the slot, and the nut engages the lips of the rail when the direction of elongation is transverse to the direction of elongation of the slot.

18. The tension mounting assembly of claim 13, wherein the cantilever snaps are adapted to engage nut assemblies with lips of the rail for the purpose of temporarily suspending the mount assembly from the rail via the cantilever snaps during installation.

19. A tension mounting assembly, comprising:
    a rail; and
    a tension mount assembly which depends from the rail by hanging therefrom, the tension mount assembly comprising at least a base portion and a mount portion which depends from the base portion by hanging therefrom,
    wherein each of the base portion and the mount portion comprise a substantially rigid, non-flammable structural support element,
    wherein at least one of these substantially rigid, non-flammable structural support elements is at least partially covered in a cushioning material in regions at or near to where the base portion and the mount portion are in contact with each other,
    wherein the base portion comprises a body having an upperside and an underside,
    wherein the tension mount assembly further comprises:
       at least a pair of bolts, and for each bolt a nut, where the bolts extend shank-first from the underside of the body of the base portion through the bolt holes, wherein each bolt is secured by one of the nuts positioned on the upperside of the body of the base portion; and a compression spring disposed over the shank of each of the bolts and between the head of each bolt and the load bearing support for the base portion, and wherein the upperside of the body of the base portion comprises a socket of at least a hemispherical shape formed therein, and the body further comprising a through aperture in the socket extending between the upperside and the underside of the body, the mount portion comprising an end portion comprising a bulbous shape, and a stem extending from the end portion, wherein the bulbous end portion of the mount portion nests in the socket of the base portion while the stem extends through the through aperture in the socket, the through aperture being sized to provide a clearance around the stem.

* * * * *

UNITED STATES PATENT AND TRADEMARK OFFICE
CERTIFICATE OF CORRECTION

PATENT NO. : 12,372,170 B2
APPLICATION NO. : 18/004050
DATED : July 29, 2025
INVENTOR(S) : William Trevor Threadgold Page 1 of 1

It is certified that error appears in the above-identified patent and that said Letters Patent is hereby corrected as shown below:

On the Title Page

| Column | Line | |
|---|---|---|
| 1 | 1 | item (73), under "Assignee", delete "Pty Ltd (AU)" and insert -- Pty Ltd, Welland (AU) -- |

Signed and Sealed this
Eleventh Day of November, 2025

John A. Squires
*Director of the United States Patent and Trademark Office*